| United States Patent [19] | [11] | 4,065,327 |
|---|---|---|
| House | [45] | Dec. 27, 1977 |

[54] BLACK CHROMATE COATINGS

[75] Inventor: John Russell House, Slough, England

[73] Assignee: Imasa Limited, England

[21] Appl. No.: 742,112

[22] Filed: Nov. 15, 1976

[30] Foreign Application Priority Data

Nov. 24, 1975 United Kingdom ............... 48273/75

[51] Int. Cl.² .............................................. C23F 7/26
[52] U.S. Cl. ................................... 148/6.21; 148/6.2; 148/6.24; 148/31.5
[58] Field of Search ....................... 148/6.21, 6.24, 6.2, 148/31.5

[56] References Cited

U.S. PATENT DOCUMENTS

| 2,483,510 | 10/1949 | Stareck | 148/6.2 X |
| 2,548,419 | 4/1951 | Chester et al. | 148/6.21 X |
| 2,894,865 | 7/1959 | Pryor | 148/6.24 X |
| 2,898,250 | 8/1959 | Pimbley | 148/6.21 |
| 3,493,441 | 2/1970 | Rausch et al. | 148/6.21 |

*Primary Examiner*—Ralph S. Kendall
*Attorney, Agent, or Firm*—Wenderoth, Lind & Ponack

[57] ABSTRACT

The properties of black chromate coatings on zinc and cadmium metal substrates are improved by treating the coating with an aqueous solution of sodium thiosulphate, sodium thioglycolate or thio urea. Treatment of the black chromate coating ensures that light fastness and corrosion resistance are reliably obtained.

6 Claims, No Drawings

BLACK CHROMATE COATINGS

There are commercially available single-dip immersion processes for producing chromate conversion coatings including jet black chromate conversion coatings, on metal substrates such as zinc or cadmium, zinc or cadmium die-castings, zinc or cadmium plate, aluminium or copper. Such coatings can afford high corrosion and abrasion resistance, resist stains and fingerprints, and serve as an excellent base for paint and other organic finishes. Black chromate coatings are expected to have utility on a large scale as radiation adsorbers in solar energy devices. Zinc plate properly coated with a black chromate coating will with stand in excess of 100 hours of standard salt spray solution without white corrosion. In addition, chromate coatings can provide considerable lubricity where sliding action is required. We currently offer a black chromate coating process under the Trade Mark Enthox ZB.992. Our fluid, like other fluids commercially available for the same purpose, consists of an acid solution of hexavalent chromium containing a small proportion of dissolved silver.

Other chromate coating solutions and processes are available for a variety of purposes. Blue passivate coating solutions provide a relatively thin film with moderate resistance to corrosion, e.g. less than 24 hours in the British Standard 1224 Salt Spray test before the appearance of white corrosion products of zinc. Iridescent passivate coating solutions provide thicker film with up to 96 hours Salt Spray resistance. Olive drab passivate coating solutions provide thick chromate films with a salt spray resistance of the order of 300 to 400 hours. Each different coating solution has an optimum immersion time, and the immersion of objects in the solution for longer or shorter times gives rise to inferior results. This invention is applicable to all these chromate coatings, but is of particular advantage in relation to coatings having a salt spray resistance of greater than 24 hours.

All these processes and solutions have been in commercial use for many years.

However, a disadvantage of such processes and solutions is that the coating and other conditions need to be rather carefully controlled in order to obtain optimum results. The use of poor conditions can give rise to products having substantially inferior corrosion resistance and also inferior light fastness in the sense that black panels turn green on exposure to light. Also it is necessary to dry the coated products, particularly black coated products, at essentially room temperature, as elevated temperature spoils the properties of the coatings. The present invention seeks to provide a treatment for chromate coatings which mitigates or overcomes these difficulties.

The present invention accordingly provides a method for treating a black chromate coated zinc or cadmium metal surface, which method comprises contacting the coated surface with an aqueous solution or dispersion of thiosulfate, thioglycolate or thiourea. Mixtures of such sulphur-containing compounds may be used with advantage.

The chemistry of chromate passive coatings is not fully understood, and we are not able to provide any rational explanation for our results. We believe, however, that the method may be in some way related to the technique of fixing in photography, and that effective sulphur-containing materials may be those suitable for fixing in photography.

Treatment may be effected by dipping the chromate coated article in an aqueous solution containing at least 0.05 Molar, preferably at least 0.15 and most perferably from 1.0 to 3.5 Molar, of the sulphur-containing compound. It is possible, though not usually desirable, to modify the pH of the solution in order to obtain better results. The temperature of the solution may be from 10° C. to 100° C., though ambient temperature is preferred, and the use of temperatures above 35° C. with thiosulphate, and possibly other compounds, may give rise to inferior results. Dipping time depends on concentration and temperature of the aqueous solution and may be from 1 second to 1 hour, but it is preferably from ½ to 5 minutes. Longer dipping times may spoil the corrosion resistant properties of the coating, and may give rise to loss of colour or a powdery effect on the surface. Similar defects may be caused by the use of too dilute solutions. The treated coated product may then be rinsed and dried. When rinsing is effected using hot water, a treated black chromate coated product has a coherent matt surface that makes it particularly suitable for solar energy uses.

A preferred sequence of operations according to the invention is as follows:

1. Provide an aqueous solution of hexavalent chromium at a concentration of from 0.1M to 3.0M and silver at a concentration of from 0.0003M to 0.1M and at a pH of from 0.5 to 4.
2. Contact the zinc or cadmium surface to be treated with the aqueous solution, e.g. by dipping, until a black chromate coating has been formed. This generally requires from 1 to 3 minutes, 2 minutes being optimum.
3. Rinse the coated product with cold water.
4. Contact the black chromate coated zinc or cadmium surface with an aqueous solution of a sulphur-containing compound as described above.
5. Rinse.
6. Dry at not more than 60° C.

The method of the invention provides the following advantages. It will be understood that not all these advantages will necessarily be observed at any one time.

a. The corrosion resistance of black chromate coated metal surfaces can be increased many times. Coatings having excellent corrosion resistance can be obtained more reliably than was hitherto possible.

b. The coated surface can be dried at elevated temperatures, where it was previously necessary to dry at ambient temperature with a consequent delay and expenditure in energy for air circulation.

c. The light fastness of the treated products can be better than that of prior chromate coated products.

The following Examples illustrate the invention.

EXAMPLE 1

A good quality black chromate finish will withstand 100 hours salt spray testing (B.S.S. 1224/1970, ASTM-B 36868). However, to illustrate the effectiveness of the post-blackening dip process, articles were processed such that without the post-blackening treatment the zinc coating would only withstand 48 hours salt spray.

Similar samples were processed in the same black chromating solution for 2 minutes and washed thoroughly. The control samples were then dried at room temperature.

The remaining samples were dipped in sodium thiosulphate (200 g/L) for 2 minutes and then thoroughly washed. The samples were divided into two batches, and were dried at either room temperature (20° C.) or at 50° C. The results are indicated below.

| Test | Sample Treatment | | Result |
|---|---|---|---|
| Salt Spray BBS 1224/1970 | Control: No dip | thiosulphate | 48 hrs. Max. |
| | Dried 20° C. | both post-dipped in sodium thio sulphate. | Greater than 120 hrs. |
| | Dried 50° C. | | |
| Daylight | Control: No dip | thiosulphate | Signs of fading after 4 weeks exposure. |
| | Dried 20° C. | Both post-dipped in sodium thiosuphate | No signs of fading after 3 months. |
| | Dried 50° C. | | |
| U.V. Radiation | Control: No dip | thiosulphate | Fading after 1 weeks (24 hrs per day) exposure. |
| | Dried ° C | Both post-dipped in sodium thiosulphate | No signs of fading after 1 months exposure. |
| | Dried 50° C | | |

EXAMPLES 2 to 4

Black chromate coated zinc panels were dipped in aqueous solutions or dispersion of various sulphur-containing compounds. Immersion was for two minutes at ambient temperature. The quoted pH is in each case the natural pH for the compound concerned. The treated coated panels were then tested:

a. for corrosion resistance by British Standard 1224 Salt Spray Test, the results being quoted in hours before the appearance of white corrosion products of zinc;

b. for light fastness by exposure to ultra-violet light, the results being quoted in days before a major change occurred.

| Ex. | Sulphur- Compound. | concentration -g/l. | pH | Salt Spray Test Hours | UV Light Days |
|---|---|---|---|---|---|
| 2 | Sodium thiosulphate . 5H$_2$O | 300 | 8.2 | 120–140 | >50 |
| 3 | Sodium thioglycolate | 175 | 6.1 | 120–140 | >50 |
| 4 | Thiourea | Saturated* | 5.3 | 200+ | >50 |
| Control | — | — | — | 50–70 | 7 |

*Thiourea is soluble in water at ambient temperature to the extend of 120–130 gram per liter.

EXAMPLE 5

Effect of pH

Black chromate coated zinc panels were dipped for two minutes at ambient temperature in various solutions each containing a saturated solution of thiourea. The solutions had a pH of, respectively, 4, 5, 6, 7, 8, 9 and 10. The treated coated panels were tested for salt spray resistance. The results were the same for all panels, indicating that pH of the solution is not important.

EXAMPLE 6

The procedure of Example 5 was repeated using solutions containing 175 g/l of sodium thioglycolate at a pH of 4, 5, 6, 7, 8, 9 and 10. Again, the results were the same for all panels.

EXAMPLE 7

The procedure of Example 5 was repeated using solutions containing 300 g/l of sodium thiosulphate at a pH of 4 and 8. The "solution" at pH 4 was essentially a dispersion of elemental sulphur. Again, the results were the same for all panels.

EXAMPLES 8 and 9

Pairs of metal substrates were given black chromate passivate coatings under suitable conditions. One panel of each pair was then immersed for two minutes at ambient temperature in an aqueous solution containing 300 g/l of sodium thiosulphate, rinsed and dried at room temperature. The corrosion resistance of the treated coated substrates and the the untreated coated substrates was compared using the Salt Spray Test, with the following results:

| Example | Metal Substrate | Treatment | Salt Spray Resistance (hrs) |
|---|---|---|---|
| 8 | Cadmium plated panel | Yes | 72 |
| | | No | 24 |
| 9 | Zinc die-casting | Yes | >600 |
| | | No | 408 |

EXAMPLE 10

Black chromate coated zinc panels were immersed for various times in thiourea solutions of varying concentrations with the following results:

| Concentration g/l | Immersion Time (Seconds) | Salt Spray Test (Hours) |
|---|---|---|
| Saturated | 30 | 200+ |
| 80 | 60 | 200+ |
| 40 | 120 | 200+ |
| 20 | 240 | 200+ |
| 10 | 480 | 200+ |
| Control | — | 50–70 |

EXAMPLE 11

Black chromate coated zinc panels were immersed for various times in sodium thiosulphate solution of varying concentrations with the following results:

| Concentration g/l | Immersion Time (Seconds) | Salt Spray Test (Hours) |
|---|---|---|
| 300 | 60 | 150-170 |
| 200 | 120 | 140-160 |
| 100 | 180 | 140-160 |
| 50 | 240 | 130-150 |

EXAMPLE 12

Black chromate coated zinc panels were immersed for 10 seconds and 90 seconds in thiourea solutions of varying concentrations with the following results:

| Concentration g/l | Salt Spray Test (Hours) | |
|---|---|---|
| | (10 Seconds) | (90 seconds) |
| Saturated | 200+ | 200+ |
| 80 | 180-200 | 200+ |
| 40 | 120-140 | 200+ |
| 20 | 100-120 | 160-180 |
| 10 | 50 | 150-170 |

Black chromate coated zinc panels were immersed in thiourea and sodium thiosulphate solutions and then dried at varying temperatures with the following results:

| Drying Temp. (20 C.) | Salt Spray Test(Hours) | | |
|---|---|---|---|
| | Control | Saturated Thiourea | 200 g/l sodium Thiosulphate |
| 100 | 12 | 120+ | 120+ |
| 80 | 24 | 120+ | 120+ |
| 60 | 48 | 120+ | 120+ |

I claim:
1. A method for treating a black chromate coated zinc or cadmium metal surface, which method comprises:
   a. providing an aqueous solution at a pH of 4 to 10 and a temperature of from 10° C to 100° C containing at least 0.05 molar concentration of a sulphur-containing compound selected from the group consisting of thiousulphate thioglycolate and thiourea,
   b. dipping the black chromate coated zinc or cadmium metal surface in the aqueous solution for a period of from 1 second to 1 hour, and
   c. drying the treated coated surface.
2. A method as claimed in claim 1, wherein the coated metal surface is dipped in an aqueous solution containing from 1.0 to 3.5 Molar concentration of the sulphur-containing compound.
3. A method as claimed in claim 2, wherein dipping is effected at a temperature of not more than 35° C. for a period of from ½ minute to 5 minutes.
4. A method as claimed in claim 2, wherein the treated coated surface is dried at a temperature not above 60° C.
5. Chromate coated metal surfaces which have been treated by the method of claim 1.
6. A method of providing a black chromate coating on a zinc or cadmium surface, comprising the following steps:
   1. providing an aqueous solution of hexavalent chromium at a concentration of from 0.1M to 3.0M and silver at a concentration of from 0.0003M to 0.2M and at a pH of from 0.5 to 4;
   2. contacting the zinc or cadmium surface to be treated with the aqueous solution, e.g. by dipping, until a black chromate coating has been formed;
   3. Rinsing the coated product with cold water;
   4. Contacting the black chromate zinc or cadmium surface with an aqueous solution at a pH of 4 to 10 and at a temperature of from 10° C to 100° C containing at least 0.05 molar concentration of a sulphur-containing compound selected from the group consisting of thiosulphate, thioglycolate and thiourea, for a period of from 1 second to 1 hour;
   5. rinsing;
   6. drying at not more than 60° C.

* * * * *